No. 857,281. PATENTED JUNE 18, 1907.
W. HOGBEN.
BALL BEARING TUBE FOR TIRES.
APPLICATION FILED OCT. 17, 1905.

Witnesses;
E. N. Barker.
K. S. Taft

Inventor:
Walter Hogben
By his Att'y. Carlos A. Taft

UNITED STATES PATENT OFFICE.

WALTER HOGBEN, OF LEOMINSTER, MASSACHUSETTS.

BALL-BEARING TUBE FOR TIRES.

No. 857,281.      Specification of Letters Patent.      Patented June 18, 1907.

Application filed October 17, 1905. Serial No. 283,112.

*To all whom it may concern:*

Be it known that I, WALTER HOGBEN, a citizen of England, and a resident at Leominster, in the county of Worcester and State of Massachusetts, have invented certain new and useful Improvements in Ball-Bearing Tubes for Tires, of which the following is a full, clear, and exact description.

This invention relates to inner tubes for tires, and has for its object to provide an inner tube adapted, when placed within an ordinary tire casing, to furnish the necessary resiliency for practical work, and which will not collapse when punctured.

Another object is to provide an inner tube adapted for use in connection with porous pneumatic tires whereby they may be converted into serviceable non-collapsible cushion tires at very little expense and with very little trouble.

A still further object of this invention is to provide an inner tube of the character described which may be used in connection with any pneumatic tire, whether it be a single tube, clencher, or the ordinary type of double tube.

With these and other objects in view, the present invention consists in the combination and arrangement of parts and will be hereinafter more fully described, shown in the accompanying drawings and particularly pointed out in the appended claims, it being understood that changes in the form, proportion, size and minor details may be made, within the scope of the claims, without departing from the spirit or sacrificing any of the advantages of the invention.

Figure 1:
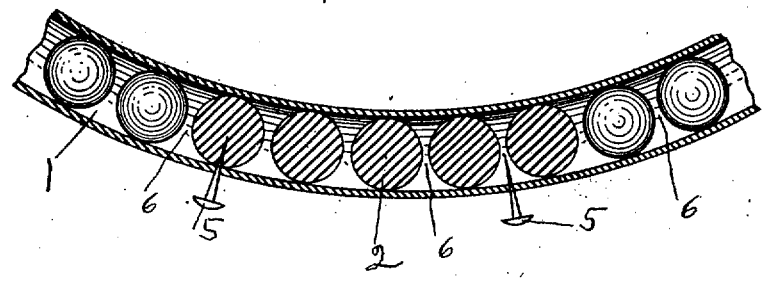
Figure 2:
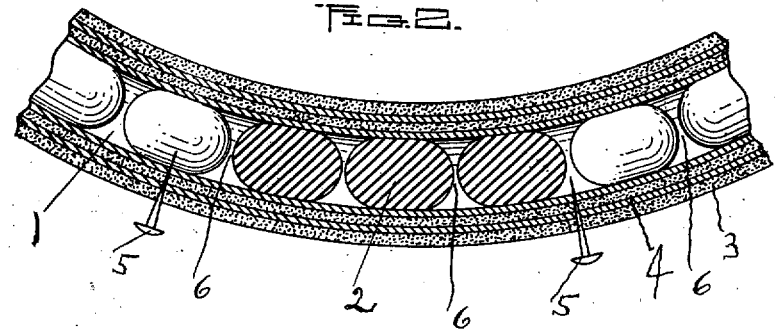
Figure 3:
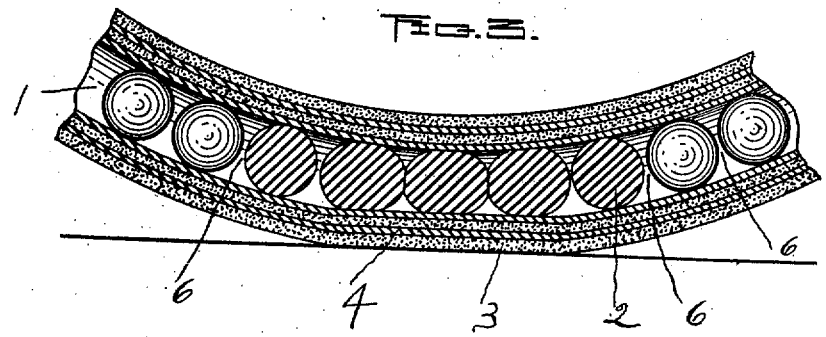
Figure 4:
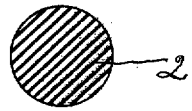
Figure 5:
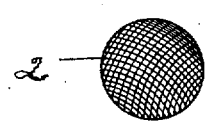

In the drawings, Figure 1 is a view, partly in section, of a portion of an inner tube embodying my invention. Fig. 2 is a similar view of the inner tube incased, and containing elongated cushioning elements. Fig. 3 is a similar view showing the compression of the spherical cushioning elements when the tire is carrying a heavy load. Fig. 4 is a cross section of a molded elastic ball, and Fig. 5 is a perspective view of an elastic ball formed by winding a strip of elastic material upon itself.

Like characters of reference designate corresponding parts throughout the several views.

The present invention includes an inner tube 1, the length of which is approximately equal to the circumference of the wheel on which it is to be used; and while the tube 1 is preferably made of rubber, it may be made of any flexible material, as it acts merely as a retainer for the elastic balls 2 placed therein, and need not, therefore, be air-tight. The elastic balls 2 are the cushioning elements and are made of rubber molded into solid spheres. If preferred, however, they may be elliptical, cubical or of any other shape, and instead of being molded may be formed by winding upon itself, into the desired shape, a string of elastic material. For light work the cushioning elements may be made hollow and filled with air under pressure, or they may be provided with channels or otherwise formed to increase their elasticity, to adapt them for the most efficient service.

It will here be explained that the tube 1 may be ring-like with a continuous inner chamber, into the interior of which the cushioning elements 2 are inserted through an aperture which is afterward sealed, said form being best adapted for use in connection with clencher casings; or the tube may be straight and sealed at both ends after the cushioning elements have been placed within it, said straight tube being adapted to be forced into place in the tubular casing 3, which is similar to those of the ordinary double tube tires. This later form of casing, illustrated in Figs. 2 and 3, is made of rubber with strips of canvas 4 reinforcing the tread portion. The cushioning elements are spaced apart, or separated by intervals, 6, within the tube, said spaces or intervals affording room for the cushioning elements to expand longitudinally of the tube when subjected to compression, as seen in Fig. 3 of the drawings, and thus insuring a high degree of flexibility and resiliency.

5 designates nails, one of which is shown puncturing the tire and entering one of the cushioning elements 2, while the other is shown with its point between two of the elements. Neither of these punctures effect the serviceability of the tire as the tire does not depend upon compressed air for its resistance, but upon the cushioning element 2.

From the foregoing it will be readily understood that the tube 1, filled with cushioning elements 2, is placed in the casing in the same manner as the inner tube of a pneumatic tire, and the tire, as a whole, secured to the rim of the wheel by any preferred means.

Having described my invention, what I claim as new and desire to secure by Letters Patent is, A device for holding up collapsed tubular tires comprising a flexible tube adapted to be inserted within the tire, solid, elastic, spherical bodies located within the tube, the sum total of the diameters of said bodies being less than the inner circumference of the tubular tire.

WALTER HOGBEN.

Witnesses:
  OSCAR A. TAFT,
  KATE S. TAFT.